Jan. 10, 1928.  
F. A. GORDON ET AL  
1,655,633  
WRAPPING MACHINE  
Filed July 14, 1926

INVENTORS.  
Frank A. Gordon  
Wallace E. Phelps  
BY A. W. Harrison  
ATTORNEY.

Patented Jan. 10, 1928.

1,655,633

UNITED STATES PATENT OFFICE.

FRANK A. GORDON AND WALLACE E. PHELPS, OF NASHUA, NEW HAMPSHIRE, ASSIGNORS TO NATIONAL BREAD WRAPPING MACHINE COMPANY, OF NASHUA, NEW HAMPSHIRE, A CORPORATION OF MASSACHUSETTS.

WRAPPING MACHINE.

Application filed July 14, 1926. Serial No. 122,354.

This invention relates to wrapping machines and has particular reference to the mechanism which supplies the articles that are to be wrapped toward or to other mechanism which advances the articles singly to position to be wrapped.

Machines of the type to which the present invention particularly relates, include a feeder for delivering the articles to a conveyor which introduces the articles into the machine. An attendant supplies a number of the articles, in a row, on said feeder, and the articles so supplied travel thereon. This feeder is shown herein as a gravity slideway such as illustrated in Letters Patent No. 1,412,754 granted April 11, 1922, to Sevigne & Arnold.

If the attendant fails to keep the feeder supplied with articles to be wrapped, it is desirable that the operation of the introducing conveyor shall cease until more articles are supplied on the feeder. One of the objects of the present invention is to automatically effect the starting and stopping of the introducing conveyor according to whether or not the feeder is properly supplied with the articles by the attendant.

Another object of the invention is to effect automatic stoppage of moving parts of the machine if an article is in a position that would result in its being crushed by a continuance of movement of such parts of the machine.

With these objects in view, the invention consists in the construction and combination of parts substantially as hereinafter described and claimed.

Of the accompanying drawings:—

Similar reference characters designate similar parts in all of the views.

Figure 1:
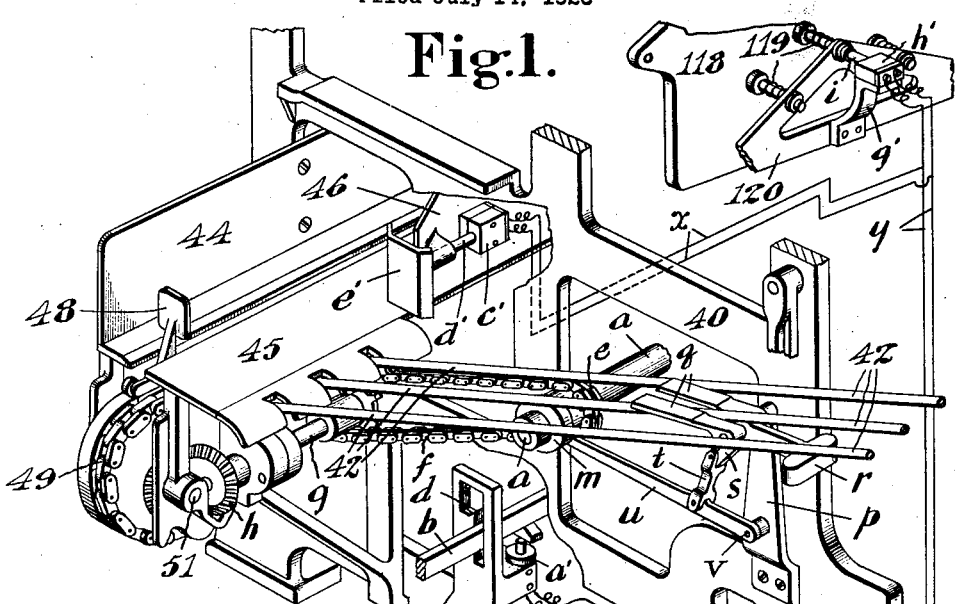
Figure 1 is a perspective view of so much of the machine as is necessary to explain the present invention.

Reference numerals are employed to designate parts which are the same, or substantially the same, as those employed in the Letters Patent hereinbefore referred to, and to which reference may be had for additional details of such parts, while reference letters are employed to designate parts relating to the present invention although some of the lettered parts are practically the same as in said patent.

A portion of the frame of the machine is illustrated at 40, and at 42 are shown portions of the rods of the gravity slideway on which unwrapped articles such as loaves of bread are placed by an attendant. The loaves slide onto a longitudinally slotted foot plate or base 45 against a stop wall 44, and into the path of pushers 48 carried by a chain 49 one of the sprockets for which is carried by shaft 51. The pushers deliver the loaves between walls 44, 46, to position to be operated upon by mechanism which wraps them, said mechanism including lifters (not necessary to illustrate herein) which elevate the loaves successively between upright walls one of which is illustrated herein at 118 (Figs. 1 and 2), the said wall 118 being carried by pins 119 slidably mounted in bracket 120 and yieldingly held in normal position by springs 121, the upper edge of said wall having a detent plate 202 over which the wrapped loaves are moved by other pushers as shown and explained in the patent referred to.

The shaft $a$ of the machine is driven by a suitable motor with a clutch mechanism controlled by a hand lever $b$, said lever extending through a bracket $c$ having a shoulder $d$.

Figure 4:
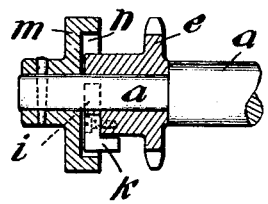

Mounted on the shaft $a$ is a sprocket $e$ (Figs. 1, 4 and 5) which is connected by chain $f$ with a sprocket of the shaft $g$ which latter, through bevel gearing $h$, drives the shaft 51. The sprocket $e$ is not, itself, secured to the shaft $a$ but is clutched thereto when loaves are passing down the slideway 42 as will now be described.

Figure 5:
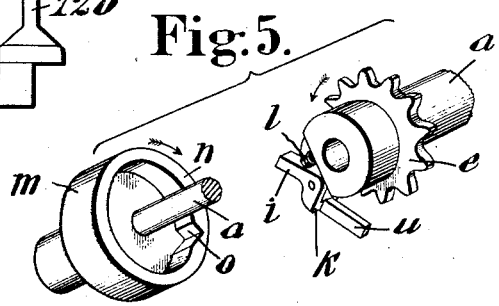

The hub of sprocket $e$ is cut away as best shown in the right hand portion of Figure 5 to provide a recess in which is pivotally mounted a pawl $i$ having a wide heel portion $k$, a spring $l$ normally pressing the pawl tip outwardly. Close to the hub of sprocket $e$ a disk $m$ is secured fixedly to the shaft $a$, said disk having its inner face recessed to provide a rim $n$ the inner surface of which is notched as at $o$.

Pivotally supported by a frame bracket $p$ (Fig. 1) is a trip member comprising one or more flat fingers $q$ having a counterweighted arm $r$ which tends to normally hold the finger or fingers *q* upwardly tilted to project above the plane of the slideway rods 42. The trip member has an arm *s* which is connected by a link *t* with a lever *u* pivoted at *v*, the tip of said lever *u* extending to cooperate with the heel *k* of the clutch pawl *i* in the manner now to be described.

The object of the mechanism which includes the trip fingers *q* is to ensure drive of the chain *f* and the parts driven thereby, especially the pusher mechanism 48, 49, only when loaves are being supplied to the machine and are sliding down the feeder 42. If no loaves are passing down, the fingers *q* remain up in about the position illustrated in Figure 1 and the lever *u* remains with its tip up in the path of rotation of the heel *k* of the pawl *i* as illustrated in the right hand portion of Figure 5. When the sprocket *e*, revolving in the direction of the arrow, causes the pawl-heel *k* to contact with the tip of the lever *u*, the pawl is swung (against the pressure of the light spring *l*) so that the tip of the pawl is swung out of engagement with the notch *o* of the positively rotated disk *m*. At the same time, rotation of the sprocket *e* (which is loose on the driven shaft *a*) is arrested and consequently no motion is transmitted to the pusher chain 49.

Usually, in operation, the slideway 42 is kept supplied with loaves in a row, close together. Such loaves, or any one of them, will so depress the fingers *q* that the arm *s* and link *t* acting somewhat as a toggle, swing the lever *u* down far enough to shift the tip of the latter below the path of the pawl-heel *k*, with the result that the spring *l* causes the tip of the pawl to enter, or remain in, the notch *o* of the disk *m*. Therefore the positively rotating disk *m* acts, through the pawl *i*, to drive the sprocket *e* and effect operation of the pusher chain 49. As soon as the supply of loaves on the feeder 42 ceases, the fingers *q* and lever *u* swing up and effect disconnection of the clutch members *i* and *o* in the manner already described. But this only effects stoppage of the mechanism which introduces loaves into the machine. The loaves already introduced will be wrapped and delivered from the machine as described in the patent hereinbefore referred to.

From the above description it will now be understood that the location of the stoppage-effecting member *q* at an intermediate point of the feeder provides a safety device which prevents crippling of loaves passing into the wrapping machine. This is because the clutch which effects operation of the chain that pushes loaves into the machine is disconnected whenever there is nothing to effect depression of the fingers *q*. Therefore, whenever said fingers are free to rise and remain up. there will always be several loaves beyond it and those loaves remain there until supply is resumed on the feeder and the fingers depressed thereby. The presence of those loaves with the farther one close to the wall plate 44, causes sufficient pressure toward said wall plate to ensure straightening up of the farther one, and every succeeding loaf, against said wall. If no loaves were left on the feeder beyond the fingers *q*, or only one loaf. the first loaf to then arrive in front of a chain pusher 48 would be liable to be so askew that it would be crushed when pushed into the machine.

Figure 3:
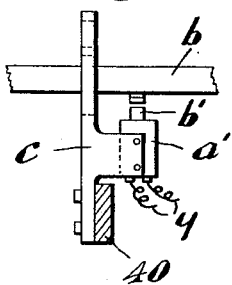

It is desirable to sometimes stop the operation of the entire mechanism of the machine, especially if a loaf being operated upon gets into a position which would result in its being crushed by continued operation of the machine. For this purpose we provide electric devices and connections now to be described. First, however, it is to be understood that in the machine of the character referred to, the starting and stopping lever *b* is down below the shoulder *d*, as illustrated in Figure 1, when the machine is in operation, said lever having a tendency, when lifted, to engage and rest on said shoulder. The present improvements include a magnet *a'* carried by the bracket *c*, said magnet being of any well-known type which, when energized, will cause its core *b'* to act upwardly against a foot piece of the lever *b* (Figs. 1 and 3) to raise said lever and cause it to engage the shoulder *d* and effect stoppage of the machine. This magnet is energized so as to bring about stoppage of the entire machine, through the instrumentality of either one of a plurality of electrical switches or contact devices located in parts of the machine where crushing of a loaf is liable to occur. Said devices have the effect that if any loaf is being moved along in other than correct position for smooth travel, the electrical circuit of the controlling magnet *a'* will be closed.

Figure 6:
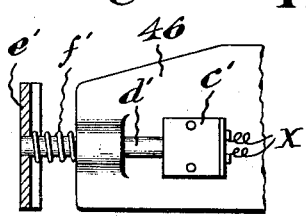
Figures 2, 3, 4, 5 and 6 are detail views of parts of the machine shown in Figure 1.

Referring to Figures 1 and 6, the wall plate 46 carries a box *c'* containing a suitable switching mechanism such as a pair of contacts or terminals for electric circuit wires *x*. Slidably mounted in a bearing projecting from the wall 46 is a rod or pin *d'* the inner end of which, in the box *c'*, serves to close the circuit through the wires *x*. The outer end of the said rod carries a plate *e'* located just to one side of the path of a loaf that is in correct or alined position to pass between the walls 44, 46. A spring *f'* serves to normally hold the rod and its plate projected and the circuit broken.

If, in the operation of the machine, any loaf on the base plate 45 and that is being started in to the machine by a pusher 48, is not properly alined close to the wall 44 but is askew, its forward end will act against the plate *e'* to push the rod *d'* in and close the circuit through the wires $x$, $y$, (Fig. 1) and cause the magnet $a'$ to push the lever $b$ up onto the shoulder $d$ and stop the machine.

Figure 2:
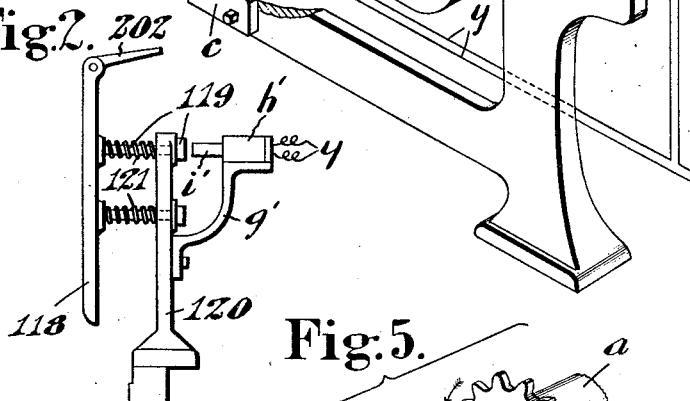

Another portion of the machine where loaves may sometimes get into a position that would result in their being crushed, is at the top of the vertical passageway or chute through which they are elevated while being wrapped and from the top of which they are pushed horizontally as explained in the patent referred to. Figures 1 and 2 illustrate the yielding wall member 118 that is at the top or upper end of the vertical passageway referred to above and in said patent. Supported by the stationary bracket 120 is a bracket $g'$ carrying a box $h'$ containing a suitable switching mechanism such as a pair of terminals for electric wires $y$ (with which the wires $x$ are connected) leading to the magnet $a'$. A pin $i'$ slidable in the box $h'$ is in alinement with one of the pins 119 of the wall member 118, the inner end of said pin serving to coact with the terminals in said box to close the circuit through the wires $y$ (and, of course, a suitable battery or other source of electrical energy not necessary to illustrate).

In the operation of the machine, if a loaf is not being pushed properly over the plate 202, but is caught against the top of the wall 118 so that it would be crushed, the wall 118 yields and the pin $i'$ is actuated to close the circuit through the wires $y$ and cause the magnet $a'$ to push the starting and stopping lever $b$ up so as to effect the stoppage of the machine.

While we have illustrated and referred to the article feeder as a gravity slideway, we do not limit ourselves thereto, as the feeder may, for instance, be a horizontally travelling belt such as employed in the machine illustrated in Letters Patent No. 1,253,636, granted January 15, 1918 to Sevigne & Arnold.

Having now described our invention, we claim:—

1. A wrapping machine having an article feeder and a conveyor for receiving articles from the feeder, a pivoted member at an intermediate point of the feeder and over which articles on the feeder pass, and means controlled by said pivoted member for effecting the stopping and starting of the said conveyor.

2. A wrapping machine having an article feeder and a conveyor for receiving articles from the feeder, means including clutch mechanism for driving said conveyor, a pivoted member at an intermediate point of the feeder and over which articles on the feeder pass, and means connected with said pivoted member for controlling said clutch mechanism.

3. A wrapping machine having an article feeder and means for taking the articles from said feeder and transferring them singly toward position to be wrapped, means including a clutch for operating said transferring means, and a pivoted tripper at an intermediate point of the feeder for controlling said clutch, said tripper being in position for articles on the feeder to pass thereover.

4. A wrapping machine having a conveyor for moving articles toward position to be wrapped, a feeder for supplying articles to said conveyor, a displaceable member at an intermediate point of the path of articles carried by the feeder, and means connected with said displaceable member for controlling the operation of the conveyor without affecting the operation of the rest of the machine.

5. A wrapping machine having means for causing the articles to be wrapped to travel and having a manually operable member for controlling the operation of the machine, and means for effecting shifting of said member to stop the machine if an article is travelling incorrectly.

6. A wrapping machine having a pusher for moving an article in a given direction, a yieldable member somewhat to one side of the path for said article and having a portion in position to receive the thrust of any askew article being moved by the pusher, and means connected with said yieldable member for effecting stoppage of the movement of the pusher if an article contacts with said member and displaces it.

7. A wrapping machine having a pusher for moving an article in a given direction, a yieldable member somewhat to one side of the path for said article and having a portion in position to receive the thrust of any askew article being moved by the pusher, and means connected with said yieldable member for effecting stoppage of the operation of the machine if an article contacts with said member and displaces it.

8. A wrapping machine having a pusher for moving an article in a given direction, a yieldable member somewhat to one side of the path for said article and having a portion in position to receive the thrust of any askew article being moved by the pusher, and electro-magnetic means connected with said yieldable member for effecting stoppage of the movement of the pusher if an article contacts with said member and displaces it.

9. A wrapping machine having pushers for tranporting articles past stationary members, and means for effecting stoppage of the operation of the machine, said means including a member projecting into the path of any article that is being transported while out of correct position.

10. A wrapping machine having a lever for controlling the starting and stopping of its operation, and means for effecting movement of the lever to stopping position when an article is being transported through the machine while turned askew.

11. A wrapping machine having an inclined primary feeder at one side thereof for supplying articles in one direction of movement, introducing mechanism for causing the articles that are to be wrapped to enter the machine, and means for effecting stoppage of the operation of the introducing mechanism without stopping the rest of the machine if the supply of articles on the said inclined feeder ceases, the said stoppage-effecting mechanism including a member located at an intermediate point of the said inclined feeder.

12. A wrapping machine having an inclined article feeder at one side thereof and a conveyor for receiving articles from said feeder, a movable member located at an intermediate point of said inclined feeder, and means controlled by said movable member for effecting stoppage of the operation of the conveyor without stopping the rest of the machine if the supply of articles on the inclined feeder ceases.

In testimony whereof we have affixed our signatures.

FRANK A. GORDON.
WALLACE E. PHELPS.